June 20, 1961 F. WOODRUFF 2,989,160
COUPLING
Filed Dec. 24, 1959

INVENTOR.
FRANK WOODRUFF
BY
Robert W. Ely

400

United States Patent Office 2,989,160
Patented June 20, 1961

2,989,160
COUPLING
Frank Woodruff, Utica, N.Y., assignor to The Bendix Corporation, a corporation of Delaware
Filed Dec. 24, 1959, Ser. No. 861,970
8 Claims. (Cl. 192—12)

This invention relates to separable clutches or connections between a driven member and a driving member and more particularly concerns disconnectable couplings in which disengagement is required when high torque is being transmitted.

An object of the present invention is to provide an improved coupling which can be disengaged when a high torque is being transmitted by applying a relatively small force.

A further object is the provision of an improved coupling which is disengaged by radial movement of engaging elements.

Another object is the provision of an improved coupling which does not involve a relatively complicated actuating mechanism which requires less space than known currently-used couplings and which is easily reengaged.

Figure 1:
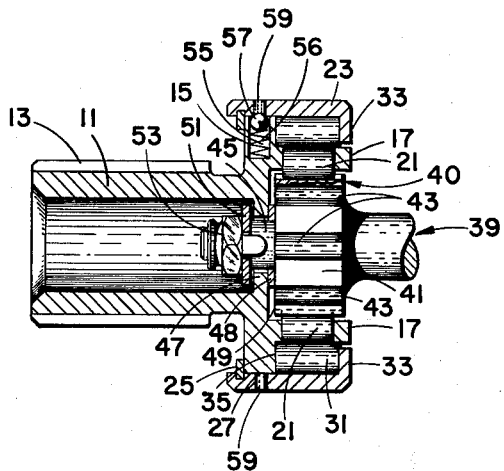
Figure 2:
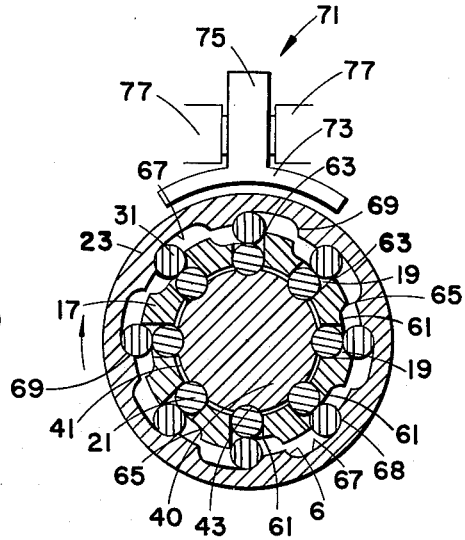
Figure 3:
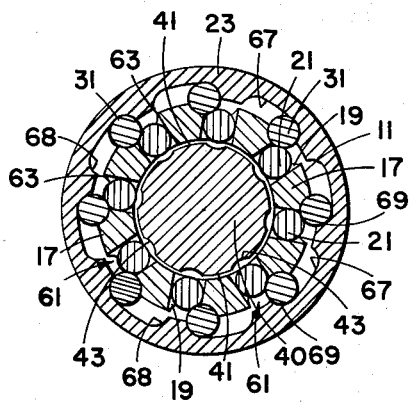
Figure 4:
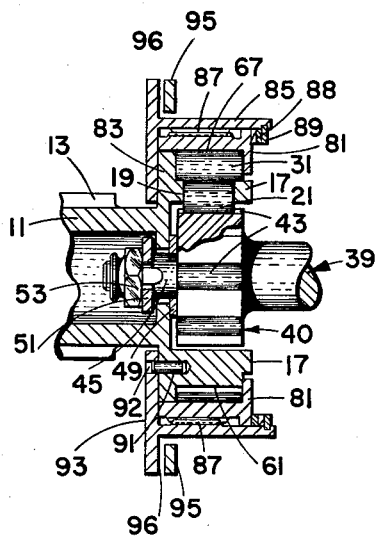

The realization of the above objects along with the features and advantages of the invention will be apparent from the following description and the accompanying drawing in which:

FIG. 1 is a longitudinal partially cross-sectional view of a coupling embodying the invention and shows two shafts coupled by means of pairs of radially-aligned rollers, FIG. 2 is a transverse cross-sectional view through the rollers and includes a schematic braking device for temporarily restraining the outer element by applying a radial force so that the inner rollers can move radially from indentations in the center shaft cylinder, FIG. 3 is a view similar to FIG. 2 except with relative rotation of the outer roller ring and rollers and radial disengagement of the inner rollers from the center shaft cylinder and FIG. 4 is a longitudinal partially cross-sectional view of another embodiment of the invention and essentially differs from FIG. 1 in that an axial force is applied to cause disengagement.

Referring to FIGS. 1–3, a first tubular shaft 11 (at the left in FIG. 1) having external splines 13 is connected to an engine (not shown) so that shaft 11 is the driving shaft. Shaft 11 has a radially-outwardly-extending flange 15 and projecting intermediately therefrom a tubular axially-extending extension or roller cage 17. Tubular extension or annular cage 17 has equispaced rectangular openings 19 in which eight inner cylindrical rollers 21 are received.

An outer roller ring 23 extends from the left side of flange 15 and is connected thereto by means of a split retaining ring 25 for sliding or rotating ring 23 relative to cage 17. Ring 23 is mounted at the left on the peripheral annular surface 27 of flange 15 for such rotation and extends axially to overhang outer cylindrical rollers 31. Roller ring 23 has an inwardly projecting lip 33 which confines outer rollers 31 along with the right face 35 of flange 15.

A second shaft 39 which is axially-aligned with the first shaft 11 and can be referred to as the driven shaft has a cylindrical end 40 and circular surface 41 radially inwardly of flange 15 and inner rollers 21. Rollers 21 are received in equally-spaced shallow arcuate indentations 43 in surface 41. A shaft extension 45 projects axially to the left from shaft 39 and extends past thrust flange 47 into the interior of shaft 11. A thrust washer 48 is mounted on shaft extension 45 between the end face 49 of shaft 39 and the adjacent face of thrust flange 47. At the other side of thrust flange 47 another thrust washer 51 is mounted on shaft extension 45 by means of nut 53.

Flange 15 of shaft 11 has a radial recess 55 in which are mounted spring 56 (shown schematically) and ball 57. Ball 57 is constructed to be partially received in one of smaller holes 59 in ring 23 to provide a radially-extending latch device. Holes 59 are circumferentially spaced to provide the ring positioning shown in FIGS. 2 and 3. Rollers 21 and 31 are magnetic with adjacent ends of opposite polarity so that there will be magnetic adherence. It is to be noted that roller cage 17 overhangs the indented circular surface 41 of shaft 39 which is inwardly of the cage 17 and that ring 23 when ball 57 is unlatched can be rotated on surface 27 of flange 15 to be angularly displaced relative to cage 17.

In FIGS. 2 and 3 it can be seen that tubular extension or roller cage 17 of shaft 11 has a plurality of axially-extending grooves 61 in the outer surface and that grooves 61 merge into the outer parts of openings 19. The end or inner aligning abutment 63 of a groove 61 which is at the full edge of opening 19 and the opposite end or inner limit abutment 65 are both rounded at axially extending lands to the contour of the lower arcuate part of an outer roller 31. Each groove 61 extends from the full edge of opening 19 and terminates a distance somewhat less than twice the equal diameter of roller 21 and roller 31. Ring 23 is also grooved having in its inner surface axially-extending grooves 67 which extend in the other or opposite direction from grooves 61. Grooves 67 also have identical rounded corners or outer aligning and limit abutments 68 and 69 which are formed by lands which extend between flange 15 and lip 33. It is to be noted that the depth of grooves 61 and 67 are such that the distance from the bottoms of grooves 61 to the bottom of grooves 67 is equal to the diameter of the rollers 31. A brake 71 is shown schematically in FIG. 2 and is comprised of an arcuate contact plate 73, a connected handle 75, and a support structure 77 arranged so ring 23 can be restrained to slip-rotate relative to cage 17. Brake 71 constitutes brake means for frictionally engaging and causing ring 23 to be released and to rotate relative to cage 17 on flange 15.

In operation of the FIGS. 1–3 coupling, torque is transmitted from the first or driving shaft 11 through inner rollers 21 and indentations 43 to second shaft 39 with the entire assembly rotating in the direction of the FIG. 2 arrow. It is apparent that the inner rollers 21 are constrained radially by the outer rollers 31 so that the inner rollers 21 are held in engagement with indentations 43 whereby a high torque can be transmitted. As shown in FIG. 2, the outer rollers 31 are maintained in contact and radial alignment with the inner rollers 21 by the positioning of the roller ring 23 so that aligning groove ends or abutments 63 and 68 in cage 17 and ring 23 position the outer rollers 31. Ring 23 is so positioned and releasably connected or latched to the shaft 11 by means of spring-biased ball 57 and circumferentially-spaced holes 59, it is apparent that, if roller ring 23 is restrained, it will be released and will rotate or slide around on flange 15 to roll outer rollers 31 out of position. However, during torque transmission, the shafts 11 and 39 are firmly drivably connected due to the radial confinement and alignment.

When it is no longer desired to transmit torque but disconnecting is desired, the brake means 71 is actuated radially inwardly to temporarily restrain ring 23 until shaft 11 rotates relative to ring 23 sufficiently for rollers 31 to roll up to the limit abutments 65 on cage 17 and the positioning shown in FIG. 3 results. It is to be noted that with outer rollers 31 against ring limit abutments 69 further relative rotation will be prevented and that rollers 31 overhang cage openings 19. Inner rollers 21 are thus free to move radially and follow outer rollers 31 so that rollers 21 do not engage the indentations 43 and shaft 39 is disconnected from shaft 11. Rollers 21 are urged outwardly by centrifugal force during rotation of cage 17 and by magnetic attraction causing inner rollers 21 to adhere to the positioned outer rollers 31. It is to be noted that inner rollers 21 move radially only a limited amount due to overhanging outer rollers 31 and are confined in openings 19 so that they can be readily moved inwardly. Ring 23 is held in its new angular position by friction at washer 55 and spring-biased ball 57 and related hole 59. To re-engage the coupling, ring 23 is rotated relative to cage 17 so that the inner rollers 21 re-engage indentations 43 and the positioning shown in FIGS. 1 and 2 results.

In FIG. 4 which shows an alternate arrangement for axial braking, the same reference numerals are applied to parts which are essentially identical to the parts of the FIGS. 1–3 embodiment and reference can be made to the above description for certain details of the FIG. 4 arrangement. The first shaft 11 is coupled to the second shaft 39 by means of inner rollers 21 and outer rollers 31 which cooperate with indentations 43, openings 19 in cage 17, and roller ring 81 which has the same internal features as ring 23 such as grooves and abutments. Ring 81 is connected to flange 83 by different outer means. Ring 81 has male splines which engage female splines on locking band 85 to form an axial spline connection 87. Wavy washer spring 88 is confined by split retaining ring 89 and permits locking band 85 to move axially to the left. A pin 91 is fixed in flange 83 and projects into a hole 92 in radially-inwardly extending flange 93 of locking band 85. An axially-movable brake 95 is arranged to abut the radially-outwardly-extending flange 96 of locking band 85. It is apparent that the lower part of the FIG. 4 arrangement is cross-sectioned to provide a showing of pin 91.

In operation of the FIG. 4 coupling, torque is transmitted from first shaft 11 through inner rollers 21 and indentations 43 to second shaft 39. As above described, inner rollers 21 are held in engagement with shaft 39 by outer rollers 31 which are aligned and confined radially. Ring 81 provides this alignment and confinement of outer rollers 31 in cooperation with the structure of the cage 17 which results in the same positioning as shown in FIG. 2. Ring 81 is connected to flange 83 of shaft 11 so that connection means are provided which, during torque transmission, prevent relative rotation but which, upon having a braking action applied, provide for relative rotation between the ring and flange 83 of shaft 11. Thus, during torque transmission ring 81 rotates with flange 83 since ring 81 is connected to flange 83 by means of locking band 85, spline connection 87, spring 88, and pin 91. This arrangement, however, provides for relative rotation of ring 81 to flange 85 since pin 91 can be disconnected by applying an axial force to flange 96 compressing spring 88.

When it is no longer desired to transmit torque but to disengage or uncouple, an axial force is applied temporarily against the right face of brake flange 96 by means of axially-movable brake 95 to give axial movement and restraint. This action results in spring 88 being compressed, locking ring 85 moving to the left to disconnect from pin 91, and relative rotation between temporarily restrained ring 81 and flange 83. This relative rotation causes outer rollers 31 to roll circumferentially so that inner rollers 21 move radially a limited extent but out of engagement with indentations 43 whereby torque is no longer transmitted. At this stage, the positioning of rollers will be the same as shown in FIG. 3 and inner rollers 21 are urged outwardly by centrifugal force against outer rollers 31 in addition to the above-mentioned magnetic attraction. Compressed spring 88 frictionally maintains the new angular positioning. Since the inner rollers 21 are confined in openings 19 and can be easily moved inwardly, re-engagement is facilitated as above described.

It is to be noted that the FIG. 4 embodiment essentially differs from the FIG. 1 embodiment only in that it has an arrangement which permits use of an axial brake 95 to disconnect and to effect relative rotation between ring 81 and flange 83 and disengagement whereby a smaller radially-dimensioned envelope is possible. With the rollers 21 and 31 being magnetic with adjacent ends of opposite polarity, shaft 39 can be the driving member in either embodiment. It is apparent that both embodiments have outer means which include outer rollers and a latch device for connecting inner rollers to shaft 11 and for aligning and positioning the inner rollers until relative rotation is effected.

It is to be understood that persons skilled in the art can make changes in the embodiments herein described without departing from the invention as set forth in the appended claims.

What is claimed is:

1. A coupling comprised of a first shaft having an axially-extending annular roller cage, a second shaft axially-aligned with said first shaft, said second shaft having a circular surface positioned inwardly of said cage, said circular surface having shallow arcuate indentations which extend axially, said cage having axially-extending openings therethrough for rollers, said first and second shafts being restrained from relative axial movement, cylindrical inner rollers respectively received in said indentations and said cage openings, outer means including cylindrical outer rollers connected to said first shaft, said outer rollers respectively being in contact and radially-aligned with said inner rollers, said outer means normally radially confining and positioning through said outer rollers said inner rollers in said indentations for drivably connecting said first and second shafts, said outer means being rotatable relative to said cage when restrained during rotation and arranged so that said outer rollers roll circumferentially and out of radial alignment with said inner rollers whereby said inner rollers can move radially from said indentations into said cage openings.

2. A coupling comprised of a first shaft having an axially-extending annular roller cage, a second shaft axially-aligned with said first shaft, said second shaft having a circular surface positioned inwardly of said cage, said circular surface having shallow arcuate indentations which extend axially, said cage having axially-extending openings therethrough for rollers, cylindrical inner rollers respectively received in said indentations and said cage openings, outer means including cylindrical outer rollers connected to said first shaft, said outer rollers respectively being in contact and radially-aligned with said inner rollers, said outer means normally radially confining and positioning through said outer rollers, said inner rollers in said indentations for drivably connecting said first and second shafts, said outer means being rotatable relative to said cage a predetermined amount when restrained during rotation and arranged so that said outer rollers roll out of radial alignment with said inner rollers whereby said inner rollers can move radially from said indentations into said cage openings, brake means arranged to engage and restrain said outer means to cause said relative rotation whereby said inner rollers move radially to disconnect said first and second shafts and are centrifugally urged away from said indentations when said first shaft is rotated, said outer means and said cage being constructed and arranged so that when said outer means is rotated relative to said cage said outer rollers permit limited radial movement of said inner rollers in said cage openings.

3. A coupling comprised of a first shaft having an axially-extending annular roller cage, a second shaft axially-aligned with said first shaft, said second shaft having a circular surface positioned inwardly of said cage, said circular surface having shallow arcuate indentations which extend axially, said cage having axially-extending openings therethrough for rollers, cylindrical inner rollers respectively received in said indentations and said cage openings, outer means including cylindrical outer rollers connected to said first shaft, said outer rollers respectively being in contact and radially-aligned with said inner rollers, said outer means normally radially confining and positioning through said outer rollers, said inner rollers in said indentations for drivably connecting said first and second shafts, said outer means being rotatable relative to said cage a predetermined amount when restrained during rotation and arranged so that said outer rollers roll out of radial alignment with said inner rollers whereby said inner rollers can move radially from said indentations into said cage openings, said inner and outer rollers being magnetic and having adjacent ends of opposite polarity, said first shaft having a radial flange connected to said cage, said outer means including a roller ring contacting said outer rollers, said roller ring and said cage having aligning abutments arranged to position said outer rollers in radial alignment with said inner rollers, said roller ring being releasibly connected to said flange.

4. A coupling comprised of a first shaft having an axially-extending annular roller cage, a second shaft axially-aligned with said first shaft, said second shaft having a circular surface positioned inwardly of said cage, said circular surface having shallow arcuate indentations which extend axially, said cage having axially-extending openings therethrough for rollers, cylindrical inner rollers respectively received in said indentations and said cage openings, outer means including cylindrical outer rollers connected to said first shaft, said outer rollers respectively being in contact and radially-aligned with said inner rollers, said outer means normally radially confining and positioning through said outer rollers, said inner rollers in said indentations for drivably connecting said first and second shafts, said outer means being rotatable relative to said cage when restrained during rotation and arranged so that said outer rollers roll out of radial alignment with said inner rollers whereby said inner rollers can move radially from said indentations into said cage openings, brake means arranged to engage and restrain said connecting means to cause said relative whereby said inner rollers move radially to disconnect said first and second shafts, said cage having axially-extending grooves for said outer rollers, said outer means having axially-extending grooves for said outer rollers and arranged with said cage grooves to provide said normal positioning of said outer rollers, said inner and outer rollers being magnetic and having adjacent ends of opposite polarity, said first shaft having a radial flange connected to said cage and abutting the ends of said outer rollers, and a latch device carried by said flange and connected to said outer means when said inner and outer rollers are radially aligned.

5. A coupling comprised of a first shaft having an axially-extending annular roller cage, a second shaft axially-aligned with said first shaft, said second shaft having a circular surface positioned inwardly of said cage, said circular surface having shallow arcuate indentations which extend axially, said cage having axially-extending openings therethrough for rollers, cylindrical inner rollers respectively received in said indentations and said cage openings, outer means including cylindrical outer rollers connected to said first shaft, said outer rollers respectively being in contact and radially-aligned with said inner rollers, said outer means normally radially confining and positioning through said outer rollers said inner rollers in said indentations for drivably connecting said first and second shafts, said outer means being rotatable relative to said cage a predetermined amount when restrained during rotation and arranged so that said outer rollers roll out of radial alignment with said inner rollers whereby said inner rollers can move radially from said indentations into said cage openings, brake means arranged to engage and restrain said outer means to cause said relative rotation whereby said inner rollers move radially to disconnect said first and second shafts and are centrifugally urged from said indentations when said first shaft is rotated, said outer means and said cage being constructed and arranged so that when said outer means is rotated relative to said cage said outer rollers permit limited radial movement of said inner rollers in said cage openings of said inner rollers, said cage having axially-extending grooves for said outer rollers, said outer means having axially-extending grooves for said outer rollers and arranged with said cage grooves to provide said normal positioning of said outer rollers and said limited radial movement of said inner rollers, said first shaft having a radial flange connected to said cage and abutting the ends of said outer rollers, and a latch device carried by said flange and connected to said outer means when said inner and outer rollers are radially aligned.

6. A coupling comprised of a first shaft having a radially-extending annular flange with an axially-extending tubular extension projecting intermediately from the flange, a second shaft having arcuate indentations for receiving rollers equally spaced in a circular surface, said second shaft being axially-aligned with said first shaft, said extension overhanging said second shaft surface, said tubular extension having openings therethrough facing said indentations for receiving rollers, inner rollers respectively received in said indentations and engaging said openings, said tubular extension having axially-extending inner grooves in the outer surface thereof, said inner grooves having a limit abutment and merging into said openings at the level of the outermost part of said inner rollers to provide an alignment abutment at the full edge of said opening, an axially-extending roller ring mounted on the outer surface of said flange, connection means releasibly connecting said ring to said radially-extending flange, said roller ring having axially-extending outer grooves in the inner surface thereof, outer rollers respectively mounted between said roller ring and said tubular extension in said outer grooves and said inner grooves, said roller ring having a radially-inwardly-extending lip axially-confining said outer rollers, said outer rollers being radially aligned with and contacting the outermost part of said inner rollers whereby said inner rollers are urged inwardly to connect said shafts, one end of said outer grooves being an outer alignment abutment respectively positioning said outer rollers at said inner alignment abutments, said outer grooves extending circumferentially in the direction opposite to said inner grooves, the other end of said outer grooves being an outer limit abutment, said limit abutments being arranged to limit said outer rollers so that said outer rollers overhang said openings when said roller ring is rotated relative to said extension, brake means arranged to provide rotation of said roller ring relative to said tubular extension; whereby said outer rollers can be displaced in said grooves from alignment with said inner rollers, said inner rollers can move radially from said indentations in said first shaft to disconnect said shafts when rotating, and said outer rollers overhang said openings to limit movement of said inner rollers to provide readily re-connectable positioning.

7. The coupling according to claim 6 and being further characterized by said roller ring having an inwardly-extending washer contacting said flange to prevent axial movement of said roller ring, said connection means including a releasible radial-extending latch device between said flange and said roller ring, and said brake means being arranged to frictionally engage said roller ring.

8. The coupling according to claim 6 and being further characterized by said connection means including a tubular locking band connected to the outer part of said roller ring by a spline connection for axial movement, said locking band having a radially-inwardly-extending flange abutting said drive shaft flange and being connected thereto by a pin connection, spring means biasing said locking band into said pin connection to provide an axially-releasible latch device, said brake means being axially arranged to frictionally engage said locking band whereby said locking band can be restrained to provide relative rotation between said roller ring and said tubular extension.

References Cited in the file of this patent

UNITED STATES PATENTS

| | | |
|---|---|---|
| 1,703,502 | Spase | Feb. 26, 1929 |
| 1,760,709 | Miller | May 27, 1930 |
| 2,621,494 | Cross | Dec. 16, 1952 |